(12) United States Patent
Menadue

(10) Patent No.: US 7,454,665 B2
(45) Date of Patent: Nov. 18, 2008

(54) APPARATUS, METHOD AND PROGRAM FOR RECORDING DIAGNOSTIC TRACE INFORMATION

(75) Inventor: Andrew J. E. Menadue, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 520 days.

(21) Appl. No.: 11/088,048

(22) Filed: Mar. 23, 2005

(65) Prior Publication Data

US 2005/0273665 A1      Dec. 8, 2005

(30) Foreign Application Priority Data

May 29, 2004   (GB) ................... 0412104.2

(51) Int. Cl.
*G06F 11/00* (2006.01)
(52) U.S. Cl. .................. 714/45; 717/128; 711/173
(58) Field of Classification Search ............. 714/39, 714/47, 45, 13; 712/220; 711/170
See application file for complete search history.

(56) References Cited

U.S. PATENT DOCUMENTS

| | | | |
|---|---|---|---|
| 4,598,364 A * | 7/1986 | Gum et al. ............. 714/38 |
| 5,737,520 A * | 4/1998 | Gronlund et al. ............. 714/39 |
| 5,768,498 A * | 6/1998 | Boigelot et al. ............. 714/39 |
| 6,134,676 A * | 10/2000 | VanHuben et al. ............. 714/39 |
| 6,279,127 B1 * | 8/2001 | Moore ......................... 714/47 |
| 6,301,677 B1 * | 10/2001 | Squibb ....................... 714/13 |
| 2003/0120980 A1 * | 6/2003 | Harris ........................ 714/45 |
| 2003/0140282 A1 * | 7/2003 | Kaler et al. .................... 714/39 |
| 2003/0167389 A1 * | 9/2003 | Soltis et al. ................. 712/220 |
| 2005/0097296 A1 * | 5/2005 | Chamberlain et al. ....... 711/170 |
| 2005/0204114 A1 * | 9/2005 | Yoder ......................... 711/203 |
| 2005/0235124 A1 * | 10/2005 | Pomaranski et al. ........ 711/170 |
| 2006/0155949 A1 * | 7/2006 | Purushothaman ........... 711/170 |
| 2007/0055914 A1 * | 3/2007 | Chandwani et al. ........... 714/47 |

* cited by examiner

*Primary Examiner*—Scott T. Baderman
*Assistant Examiner*—Kamini Patel
(74) *Attorney, Agent, or Firm*—Dillon & Yudell LLP

(57) ABSTRACT

A method of recording diagnostic trace information is disclosed. According to one embodiment, a method is provided in which metadata corresponding to each of a set of events that are subject to tracing is stored, wherein the metadata indicates how useful each of the events is in determining a root cause of a failure. This metadata is used to vary an apportionment of a memory among the events. Diagnostic trace information is then stored within the memory according to the apportionment.

20 Claims, 4 Drawing Sheets

APPARATUS, METHOD AND PROGRAM FOR RECORDING DIAGNOSTIC TRACE INFORMATION

PRIORITY CLAIM

This application claims priority of United Kingdom Patent Application No. 0412104.2 filed on May 29, 2004, and entitled "Apparatus, Method and Program for Recording Diagnostic Trace Information."

BACKGROUND OF THE INVENTION

1. Technical Field

This invention relates to the field of computer systems and in particular to an apparatus, method and program for recording diagnostic trace information in computer systems.

2. Background

The concept of recording diagnostic trace information in computer systems is well known in the art. Conventionally, trace tables are data buffers that are filled as a program executes with time-stamped status information about what the program is doing. In the computer system and application environment, trace tables are a key instrument to allow problem determination during development and for field support.

Presently trace tables in many computer systems are stored in non-persistent memory. In certain system environments, memory size is very limited and is primarily reserved for customer application data.

The use of memory for the trace tables is limited by the cost of memory and its physical size. This limits the amount of memory usable for trace table data. This trace table size limitation leads to the trace tables wrapping, sometimes within seconds depending on system and load conditions. This can cause valuable trace information to be lost as a problem develops over a given period. The loss of such trace information slows or even prevents problem determination. Furthermore, when comprehensive program tracing is required, the likelihood of the vital trace information being overwritten is increased.

One conventional solution to the problem of analysis being frustrated by key information in the trace table being overwritten by more recent entries is to devise various alternative ways to retry the failed task but to stop the code closer to the event that caused the problem. This has the disadvantage that it is time consuming and requires problem recreation which is not always possible.

A further proposal for improvement is the use of various "levels" of interest of trace entries. For example, one might assign trace events to three levels, in increasing perceived importance: Information, Warning and Error. Each might be preserved in different storage areas, and thus mere informational message entries would be less likely to overwrite more important error message entries. The disadvantage here is that even this degree of separation is not always sufficient, as a "root cause" error trace entry can be overwritten quite rapidly by the cascade of entries corresponding to further errors that it has caused in dependent or subsequent operations performed by the system.

It would thus be desirable to provide a method and apparatus for recording trace information in computer systems in such a manner that records for rarely-occurring events most likely to be indicative of the true root cause of a problem may be retained longer than records for events less likely to be indicative of the root cause of a problem.

SUMMARY OF THE INVENTION

In a first aspect, the present invention provides a method of recording diagnostic trace information within a memory, comprising: storing metadata corresponding to each of a plurality of events that are subject to tracing, wherein the metadata indicates how useful each of the plurality of events is in determining a root cause of a failure; varying an apportionment of the memory among the plurality of events based upon the metadata; and storing diagnostic trace information within the memory according to the apportionment.

In a second aspect, the present invention provides an apparatus to record diagnostic trace information, comprising: a memory to store diagnostic trace information and metadata corresponding to each of a plurality of events that are subject to tracing, wherein the metadata indicates how useful each of the plurality of events is in determining a root cause of a failure; and a tracing component to vary an apportionment of the memory among the plurality of events based upon the metadata, wherein the diagnostic trace information is stored within the memory according to the apportionment.

In a third aspect, the present invention provides a computer program product comprising computer program code which, when loaded into a computer system and executed thereon, causes the computer system to perform all operations of a method according to the first aspect.

The various embodiments of the present invention are of particular advantage in large, complex system environments and in environments, such as embedded devices, in which memory size is limited, but diagnosis of error conditions is of great importance.

BRIEF DESCRIPTION OF THE DRAWINGS

A preferred embodiment of the present invention will now be described, by way of example only, with reference to the accompanying drawings in which.

DETAILED DESCRIPTION OF ILLUSTRATIVE EMBODIMENT

Figure 1:
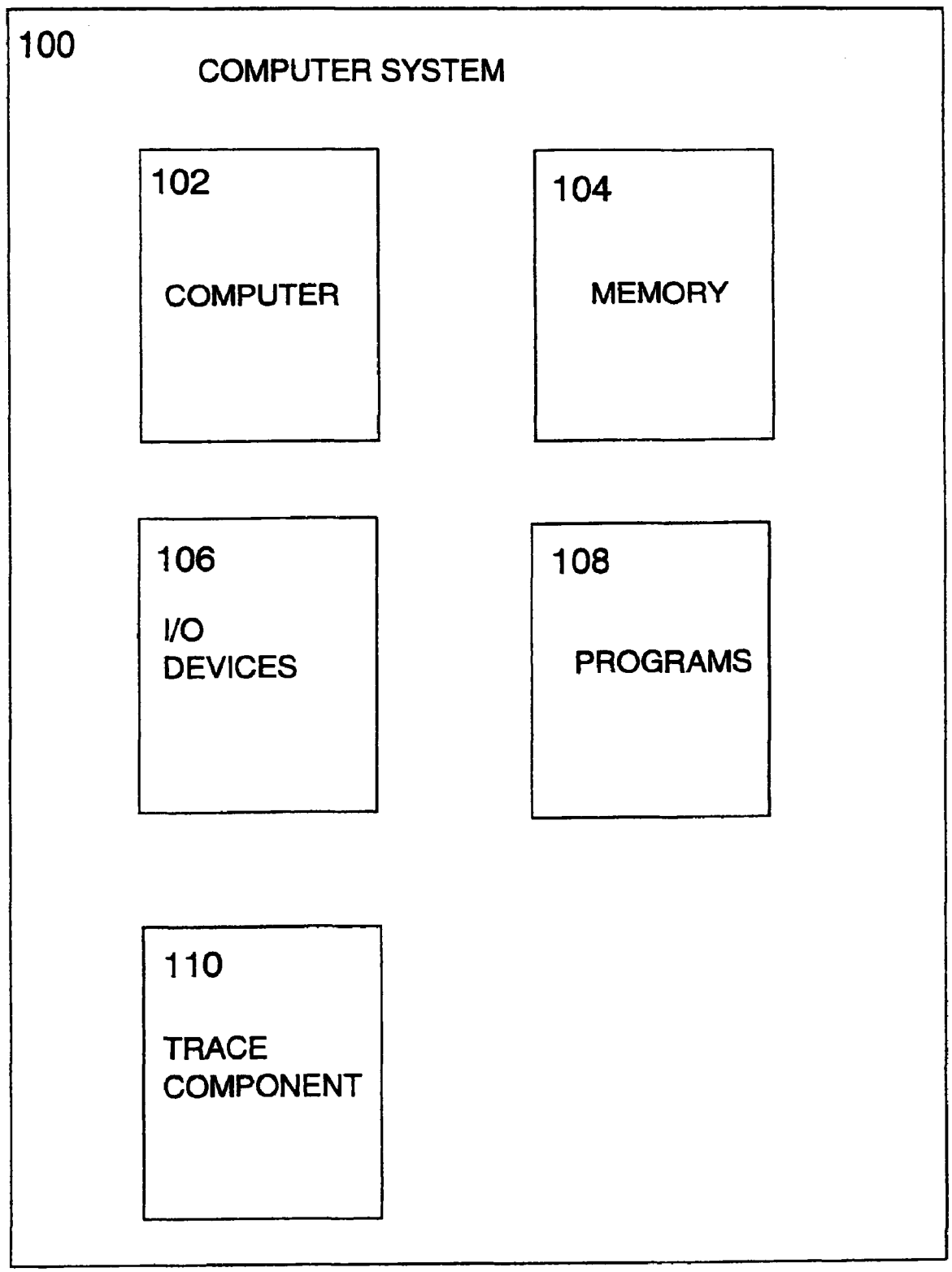
FIG. 1 is a block diagram of a computer system in accordance with an embodiment of the present invention.

Referring to FIG. 1, a schematic block diagram of a computer system 100 is shown in which an embodiment of the present invention may be implemented.

Computer system 100 comprises a computer 102 for processing data, a memory 104 for storing data, one or more I/O devices 106, and one or more system or applications programs 108. Computer system 100 further comprises a tracing component 110, which may trace events during the operation of the computer system. Such events may be at the system level, or may be within programs running within the system.

A large variety of arrangements of computers and other devices in such a system is possible and only a very simplified arrangement is shown in the figure.

Many known computer systems have a non-persistent (or "volatile") memory such as some portion of memory 104 in which system and application program data is stored and in which trace table data is also stored. Trace table data is typically time-stamped status information about what the computer system hardware or a system or applications program therein is doing.

Using a non-persistent portion of memory (e.g., memory 104) allows large amounts of trace data to be recorded, being only limited by the size of the allocated device storage used to house the non-persistent portion of memory 104. This has the advantage of providing an extended trace history required to determine problems that develop gradually over a period of time.

Figure 2:
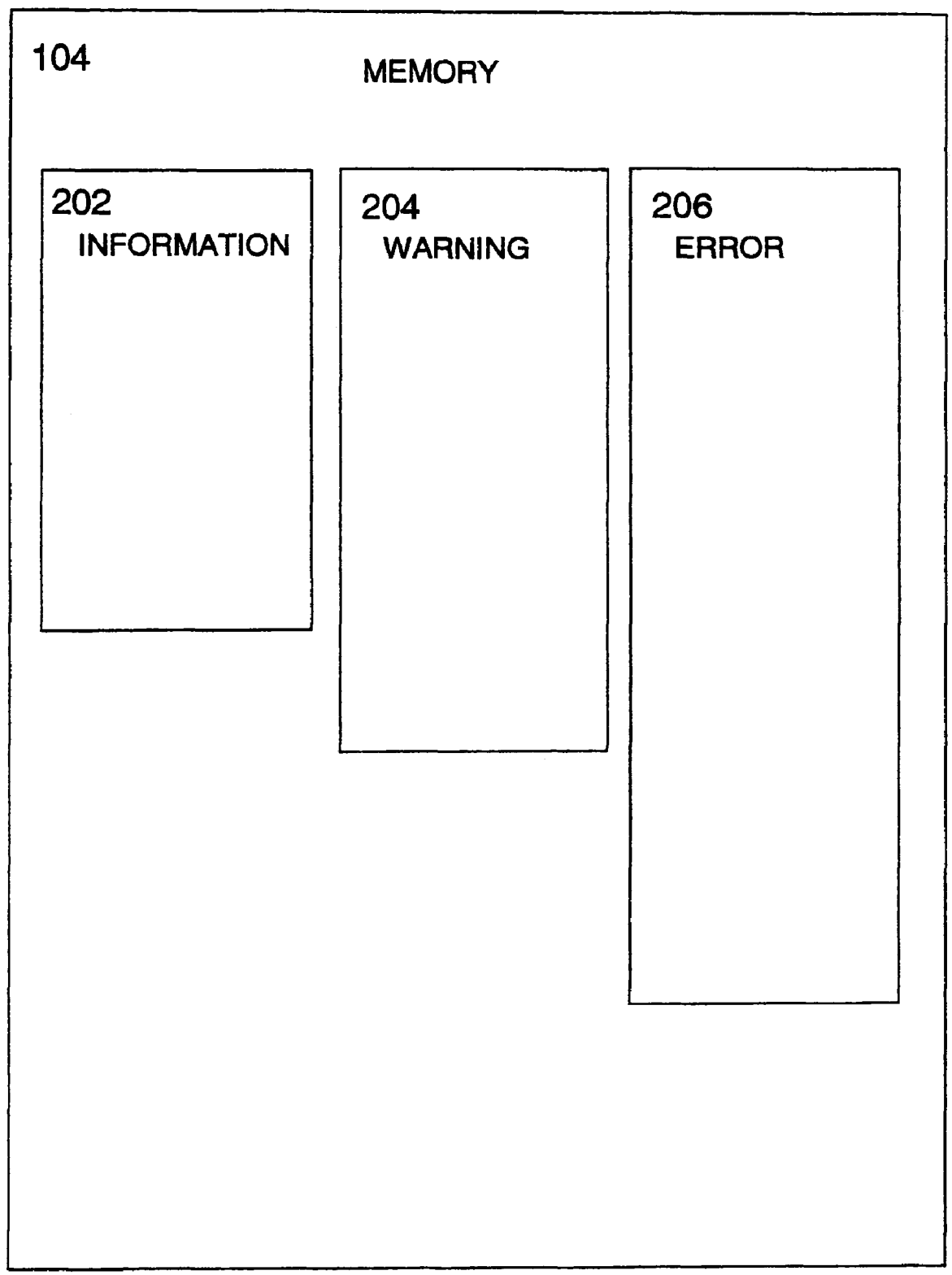
FIG. 2 is a schematic diagram of the trace buffers of a conventional computer system.

Referring now to FIG. 2, there is shown a schematic diagram of a set of buffers 202, 204, 206 in a memory 104 of a computer system (which may comprise computer system 100). In the illustrated embodiment, buffer 202 is used to store very frequent information-level trace event records, which are likely to be of the least importance in diagnosing system or program failures. Buffer 204 is used to store slightly less frequent, but more important, warning-level trace event records. Buffer 206 is used to store infrequent, but typically most important error-level trace event records. Such error-level trace event records are those which it is most desirable to retain for the longest period before overwriting them. It is known in the art to have variable lengths of buffers to give a greater statistical chance of preservation to those events that are at the error level, by providing the largest buffer for that purpose. However, in most systems of any complexity, even events at the error level are frequently overwritten before they can be used in determining a root cause error.

Using trace buffers as illustrated in FIG. 2, there is additionally no granularity in distinguishing among events at the error or other levels according to the likelihood of their being the root cause errors of a cascade of errors.

Furthermore, disadvantages described herein with respect to conventional trace recording systems are still applicable, even when techniques such as statistical sampling of trace buffers or dividing the device memory into plural trace buffers each associated with a particular portion of code are used in addition to the level-based variable plurality of buffers.

Figure 3:
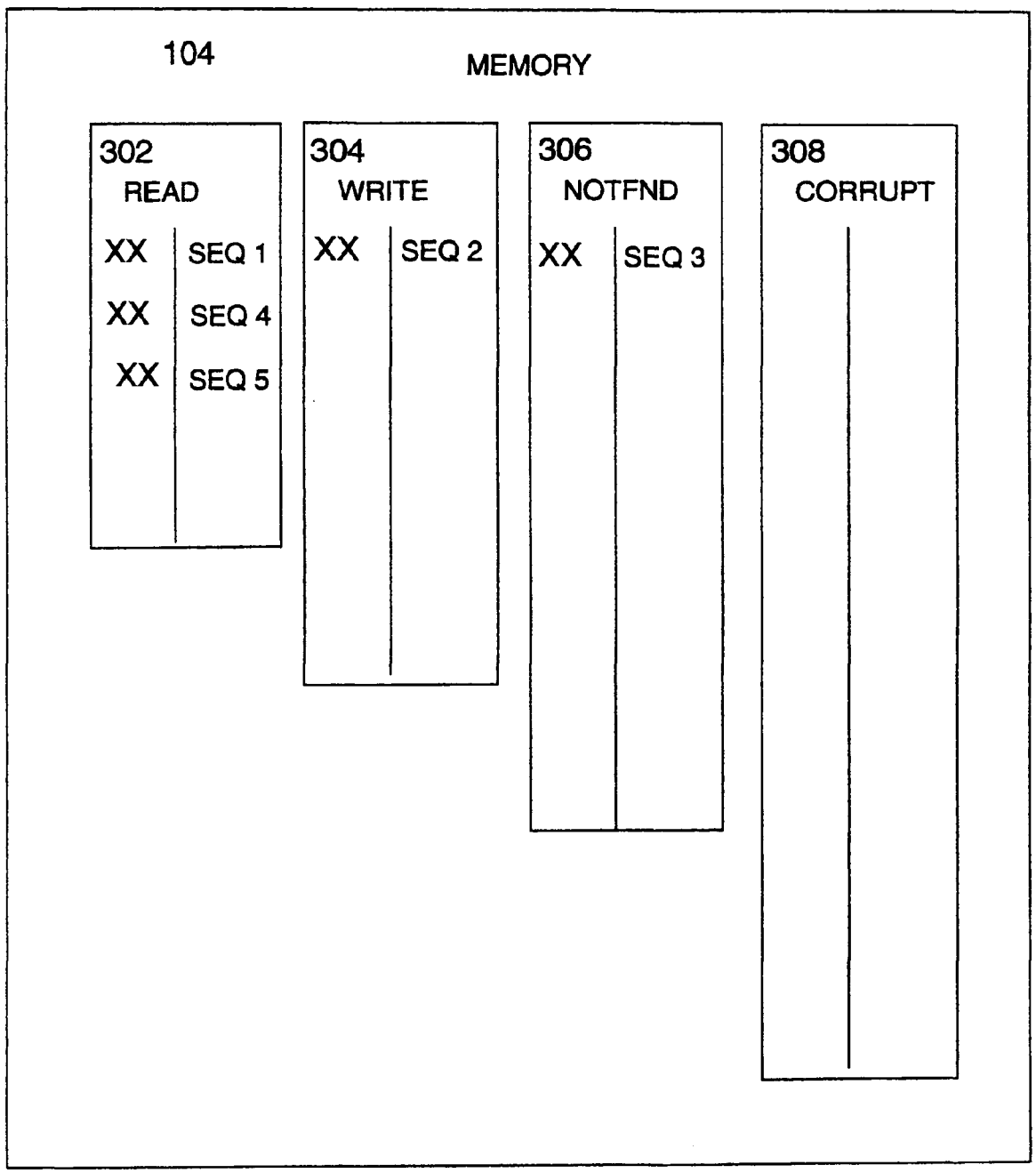
FIG. 3 is a schematic diagram of the buffers of computer system in accordance with an embodiment of the present invention.

Thus, in accordance with an embodiment of the present invention, there may be provided a set of buffers as shown in FIG. 3. In FIG. 3, memory 104 of a computer system such as computer system 100 is provided with exemplary buffers 302, 304, 306, 308. In reality, there is a separate buffer for each possible trace event, and these events typically number in the hundreds, even for a relatively simple system or program. Thus, the merely exemplary embodiment shown in the FIG. 3 is very much simplified as compared to alternative embodiments of the present invention.

In the exemplary embodiment shown in FIG. 3, a computer system such as computer system 100 comprises four events that are subject to tracing by a tracing component, such as tracing component 110. The four events are READ FILE, WRITE FILE, FILE NOT FOUND and FILE CORRUPTED. For some events (e.g., READ FILE and WRITE FILE), there will be many more event occurrences, and thus many more records will be written. Such events are also less likely, in themselves, to indicate the root cause of an error in the system or program than other events (e.g., FILE NOT FOUND and FILE CORRUPTED). Occurrences of FILE NOT FOUND events will be less frequent than READ FILE and WRITE file events, but typically more frequent than FILE CORRUPTED events. FILE NOT FOUND and FILE CORRUPTED events are also more likely to be important in indicating the root cause of an error than are the READ FILE and WRITE FILE events. However, FILE NOT FOUND events may be relatively easily recovered from, and are less likely to trigger a cascade of errors as large as that which can be triggered by a FILE CORRUPTED event.

For the reasons described herein, it would be desirable to preferentially preserve more important (from an error root cause detection perspective), but less frequently-occurring trace events. Thus, in one embodiment, buffers are tuned to size according to these factors of frequency and importance in preserving trace data for events that are more likely to be root causes of errors.

In the exemplary embodiment, READ FILE and WRITE FILE events are of roughly equal frequency, but a READ FILE is somewhat less likely to be a root cause of a cascade of errors, as there are typically fewer chances of causing an error that cannot simply be cured by retrying the operation. Thus, buffer 302, used for READ FILE events, is smaller than any other of the illustrated buffers, as an earlier buffer wrap and loss of event data is of less moment than for the other three events. Buffer 304, used for WRITE FILE events, is then somewhat larger, and so on, following the logic outlined above, with buffer 306 for FILE NOT FOUND events being larger and buffer 308 for FILE CORRUPTED events being the largest of those illustrated.

Tracing component 110 is preferably operable to maintain metadata corresponding to each event in some form of storage, such as a portion of memory 104. The metadata maintained by tracing component 110 may be controlled in such a manner as to vary its apportionment of parts of memory 104 among buffers 302, 304, 306, 308 according to a system-wide setting, which setting may further be a system runtime setting. In one alternative embodiment, metadata maintained by tracing component 110 may be controlled in such a manner as to vary its apportionment of parts of memory 104 among buffers 302, 304, 306, 308 according to a program runtime setting.

In an alternative embodiment, metadata may be used to control apportionment of memory 104 according to an outcome of a heuristic process. The heuristic process may be one based, for example, on previous runtime traces or statistics that give an indication as to how the memory 104 may best be apportioned to buffers 302, 304, 306, 308 for a particular system configuration or program type.

The program runtime setting may, in one embodiment, be advantageously reset according to a recalculation of an optimized apportionment during processing to vary the apportionment based on a new outcome of the heuristic process using values from a current run.

Turning again to FIG. 3, in order to permit the assembly of a substantially continuous overall trace sequence, each record in each buffer is preferably issued with a sequence number SEQ 1, SEQ 2, SEQ 3, SEQ 4, SEQ 5 in addition to its timestamp. The sequence numbers are unique across the complete set of buffers 302, 304, 306, 308, thus allowing a proper sequencing by tracing component 110, even if there are non-unique timestamps caused, for example, by any form of truly parallel processing or by an insufficiently granular time-stamping component in the computer system, such as computer system 100.

Figure 4:
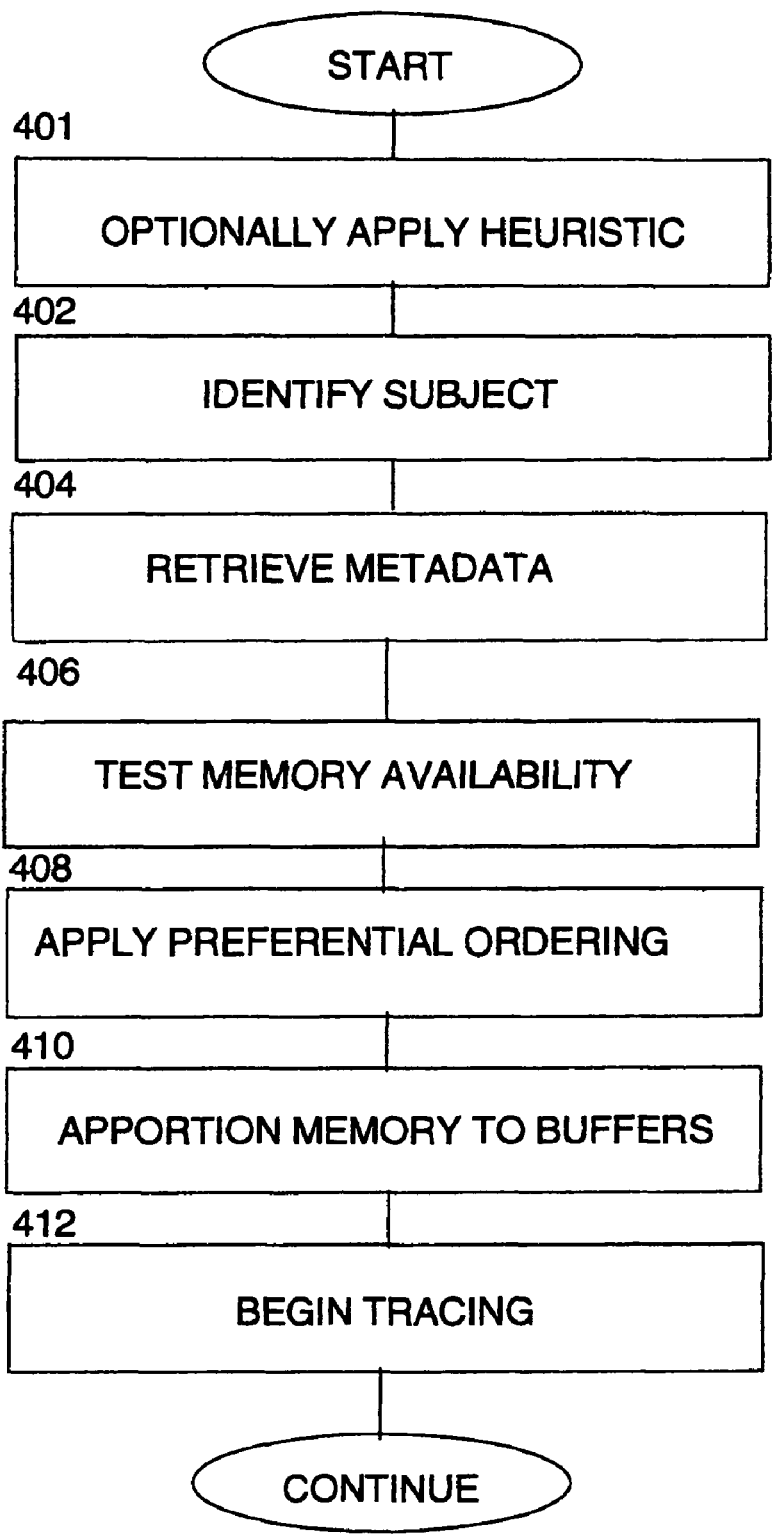
FIG. 4 is a flow diagram of a method of recording trace information in accordance with an embodiment of the present invention, whether implemented in software, hardware logic, firmware or any combination thereof.

Referring now to FIG. 4, there is shown a flow diagram representing a method according to an embodiment of the present invention. In the illustrated process embodiment, the system or program that is subject to tracing is identified (process block 402) to a tracing component (e.g., tracing component 110). Metadata corresponding to possible system or program events is then retrieved (process block 404) that are subject to tracing. Next, the total portion of memory that is available to store trace records is determined (process block 406). Once memory availability has been determined, preferential ordering is applied (process block 408) to the possible system or program events. Portions of memory are then allocated (process block 410) to act as trace buffers (e.g., trace buffers 302, 304, 306, 308) using the retrieved metadata. Following allocation of trace buffer memory, tracing activity of the system or program begins (process block 412).

In the illustrated process embodiment, a heuristic technique is optionally applied, prior to identification of the system or program being traced, to data from previous program or system activity (process block 401). Such a heuristic technique may comprise analysis of one or more prior traces or other records and statistics relating to operation of the system or program containing events subject to tracing. As described herein, an additional instance of these operations may be advantageously used to reapply the varying of memory buffer apportionment according to a heuristic outcome during a run. In an alternative embodiment, a user (e.g., a programmer, engineer or other party) may determine and set up a logical metadata arrangement according to experience and knowledge of typical behaviours exhibited by the system or program containing the events that are subject to tracing.

Method embodiments of the present invention may suitably be embodied in a logic apparatus comprising logic means to perform method operations. Moreover, such logic means may comprise hardware components, firmware components, or a combination thereof.

It will be appreciated that method embodiments described herein may also suitably be carried out fully or partially in software running on one or more processors (not shown), and that such software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

The present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analog communications lines, or intangibly using wireless techniques, including but not limited to microwave, infrared or other transmission techniques. The series of computer readable instructions may embody all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, shrink-wrapped software, pre-loaded with a computer system, for example, on a system ROM or fixed disk, or distributed from a server or electronic bulletin board over a network, such as the Internet or World Wide Web.

What is claimed is:

1. A method of recording diagnostic trace information within a memory, said method comprising:
   retrieving metadata corresponding to a computer system or computer program that is subject to tracing, wherein said metadata indicates the usefulness of each of a plurality of possible events that can occur within said computer system or computer program in determining a root cause of a failure;
   applying preferential ordering to said plurality of possible events based on said metadata;
   allocating a separate trace buffer within a memory of said computer system for each of said plurality of possible events, wherein the size of each trace buffer is based on said preferential ordering such that a smaller of said trace buffers is utilized to store frequent information-level trace event records and a larger of said trace buffers is utilized to store infrequent information-level trace event records; and
   storing diagnostic trace information as a unique sequence number along with a timestamp in each of said trace buffers within said memory accordingly.

2. The method of claim 1, wherein said trace buffers are allocated within a portion of said memory assigned to store trace records.

3. The method of claim 1, wherein said trace buffers associated with possible events that are less useful in determining a failure root cause are smaller than said trace buffers associated with possible events that are more useful in determining a failure root cause.

4. The method of claim 1, wherein said applying further includes applying preferential ordering to said plurality of possible events according to at least one of a system runtime setting and a program runtime setting.

5. The method of claim 1, wherein said applying further includes applying preferential ordering to said plurality of possible events according to an outcome of a heuristic process.

6. The method of claim 1, wherein said frequent information-level trace event records are less important than said infrequent information-level trace event records.

7. The method of claim 1, wherein said storing further includes storing a record within said memory for each of said plurality of possible events, wherein each of said record includes a sequence marker indicating a corresponding position of each possible event within a substantially continuous sequence of possible events.

8. An apparatus for recording diagnostic trace information, said apparatus comprising:
   means for retrieving metadata corresponding to a system or program that is subject to tracing, wherein said metadata indicates the usefulness of each of a plurality of possible events that can occur within said system or program in determining a root cause of a failure;
   means for applying preferential ordering to said plurality of possible events based on said metadata;
   a trace component for allocating a separate trace buffer within a memory for each of said plurality of possible events, wherein the size of each trace buffer is based on said preferential ordering such that a smaller of said trace buffers is utilized to store frequent information-level trace event records and a larger of said trace buffers is utilized to store infrequent information-level trace event records; and
   a memory for storing diagnostic trace information as a unique sequence number along with a timestamp in each of said trace buffers within said memory accordingly.

9. The apparatus of claim 8, wherein said trace buffers are allocated within a portion of said memory assigned to store trace records.

10. The apparatus of claim 8, wherein said trace buffers associated with possible events that are less useful in determining a failure root cause are smaller than said trace buffers associated with possible events that are more useful in determining a failure root cause.

11. The apparatus of claim 8, wherein said means for applying further includes means for applying preferential ordering to said plurality of possible events according to at least one of a system runtime setting and a program runtime setting.

12. The apparatus of claim 8, wherein said means for applying further includes means for applying preferential ordering to said plurality of possible events according to an outcome of a heuristic process.

13. The apparatus of claim 8, wherein said frequent information-level trace event records are less important than said infrequent information-level trace event records.

14. The apparatus of claim 8, wherein said means for storing further includes means for storing a record within said memory for each of said plurality of possible events, wherein each of said record includes a sequence marker indicating a corresponding position of each possible event within a substantially continuous sequence of possible events.

15. A computer storage medium having a computer program product for recording diagnostic trace information within a memory, said computer storage medium comprising:
    computer program code for retrieving metadata corresponding to a system or program that is subject to tracing, wherein said metadata indicates the usefulness of each of a plurality of possible events that can occur within said system or program in determining a root cause of a failure;
    computer program code for applying preferential ordering to said plurality of possible events based on said metadata;
    computer program code for allocating a separate trace buffer within a volatile memory for each of said plurality of possible events, wherein the size of each trace buffer is based on said preferential ordering such that a smaller of said trace buffers is utilized to store frequent information-level trace event records and a larger of said trace buffers is utilized to store infrequent information-level trace event records; and
    computer program code for storing diagnostic trace information as a unique sequence number along with a timestamp in each of said trace buffers within said volatile memory accordingly.

16. The computer storage medium of claim 15, wherein said trace buffers are allocated within a portion of said memory assigned to store trace records.

17. The computer storage medium of claim 15, wherein said trace buffers associated with possible events that are less useful in determining a failure root cause are smaller than said trace buffers associated with possible events that are more useful in determining a failure root cause.

18. The computer storage medium of claim 15, wherein said computer program code for applying further includes computer program code for applying preferential ordering to said plurality of possible events according to at least one of a system runtime setting and a program runtime setting.

19. The computer storage medium of claim 15, wherein said computer program code for applying further includes computer program code for applying preferential ordering to said plurality of possible events according to an outcome of a heuristic process.

20. The computer storage medium of claim 15, wherein said computer program for storing further includes computer program code for storing a record within said memory for each of said plurality of events, wherein each of said record includes a sequence marker indicating a corresponding position of each possible event within a substantially continuous sequence of possible events.

* * * * *